(12) United States Patent
Miller

(10) Patent No.: US 9,043,028 B2
(45) Date of Patent: May 26, 2015

(54) METHOD OF DETERMINING THE ORIENTATION OF A MACHINE

(71) Applicant: Trimble Navigation Limited, Sunnyvale, CA (US)

(72) Inventor: Robert Michael Miller, Commerce City, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 140 days.

(21) Appl. No.: 13/799,447

(22) Filed: Mar. 13, 2013

(65) Prior Publication Data

US 2014/0277728 A1    Sep. 18, 2014

(51) Int. Cl.
```
G01S 5/00      (2006.01)
B25J 9/16      (2006.01)
B25H 7/00      (2006.01)
G01C 15/00     (2006.01)
G01S 5/16      (2006.01)
G05D 1/02      (2006.01)
```

(52) U.S. Cl.
CPC .............. B25J 9/1684 (2013.01); B25H 7/00 (2013.01); G01C 15/00 (2013.01); G01S 5/163 (2013.01); G05D 1/0236 (2013.01)

(58) Field of Classification Search
CPC .............................. G06T 7/004; G06T 7/2033
USPC ............. 700/258; 701/50; 404/90, 93, 94, 96, 404/84.05; 702/5, 85, 94–97; 342/22, 25 A, 342/25 B, 54, 58, 82, 61, 118
See application file for complete search history.

(56) References Cited

U.S. PATENT DOCUMENTS

| | | | | |
|---|---|---|---|---|
| 5,375,663 | A * | 12/1994 | Teach .............................. | 172/4.5 |
| 8,500,106 | B2 | 8/2013 | Tsuda et al. | |
| 2009/0259373 | A1* | 10/2009 | Nichols et al. .................. | 701/50 |
| 2010/0201007 | A1 | 8/2010 | Tsuda et al. | |
| 2012/0163656 | A1 | 6/2012 | Wang et al. | |
| 2014/0214238 | A1* | 7/2014 | Braunstein et al. ............... | 701/2 |
| 2014/0228982 | A1* | 8/2014 | Bharwani ....................... | 700/56 |

FOREIGN PATENT DOCUMENTS

WO            9928566 A1    6/1999

OTHER PUBLICATIONS

"PCT/US2014/025036 International Search Report and Written Opinion", Jul. 24, 2014, 9 pages.

* cited by examiner

*Primary Examiner* — Dalena Tran

(57) ABSTRACT

A method of determining the orientation of a robotic machine at a worksite contemplates providing a target on the machine, moving the target to a first position on said machine, determining the location of the first position in the worksite, moving the target to a second position on said machine, and determining location of the second position in the worksite. The first and second positions are known with respect to the machine. Finally, a vector between the first and second locations defines the orientation of the machine with respect to the worksite. The target may be moved to additional positions on the machine.

18 Claims, 4 Drawing Sheets

METHOD OF DETERMINING THE ORIENTATION OF A MACHINE

CROSS-REFERENCE TO RELATED APPLICATION

Not applicable.

STATEMENT REGARDING FEDERALLY SPONSORED RESEARCH OR DEVELOPMENT

Not applicable.

BACKGROUND

This relates to a method of determining the orientation of a machine that is movable about a worksite in a building. More particularly, this relates to such a method in which the machine carries a single target, the location of which is determined using a robotic total station.

When the interior of a building is being built out, it is extremely useful to refer to Building Information Modeling (BIM) data. This data defines the internal building structure in three dimensions, and its use increases the productivity of the construction workers by facilitating the location and placement of various construction features, elements and fixtures. The BIM data defines the building geometry, spatial relationships, and the quantities and properties of building components.

Typically, a substantial amount of effort has been required to lay out the many construction points in a building. Teams of workers have been needed to measure and mark predetermined locations on floors, walls and ceilings. This process has been subject to errors, many of which resulted from measurement mistakes and from accumulated errors. Further, the cost and the time needed to perform the layout process have both been significant.

Automating the layout process in a building interior construction site has reduced the time required for this task. This has been accomplished by using a robotic total station device, positioned at a known location within the building. The total station directs a beam of laser light to construction points, illuminating floors, ceilings or walls at the construction points so that a worker may mark the points.

It will be appreciated, however, that a large number of construction points must typically be located within a building interior construction site. To accomplish this even more efficiently, consideration has been given to a robotic, self-propelled machine that travels about the building floor, and that includes a marker that is actuated to bring it into contact with the floor, marking the construction points. The path and position of the robotic, self-propelled machine are monitored by a robotic total station that continuously provides location information to the self-propelled machine via wireless communication. The robotic machine moves about the worksite, lowering its marker into contact with the floor to mark various construction points, as defined by the BIM data. A difficulty encountered with such an arrangement is making a determination of the orientation of the robotic machine. That is, while the system will typically know the location of the machine, based on the location of the single target which it carries, the system has not been able to determine easily the orientation or heading of the machine. The heading of the machine is important for a number of reasons, including providing for the initial movement of the machine toward a construction point, or the initiation of the drawing of a line.

SUMMARY

A method of determining the orientation of a robotic machine at a worksite when the machine is stationary, includes the steps of providing a target on the machine, moving the target to a first position on the machine, determining the location of the first position in the worksite, moving the target to a second position on the machine, the first and second positions being known with respect to the machine, and defining a vector therebetween of a known orientation with respect to the machine, determining the location of the second position in the worksite. The orientation of the vector is then determined with respect to the worksite. The steps of determining the location of the first position in the worksite and determining the location of the second position in the worksite may be performed with a robotic total station that directs a beam of laser light at the target when the target is in the first position and in the second position. The steps of determining the location of the first position in the worksite, moving the target to a second position on the machine, the first and second positions being known with respect to the machine, and determining the location of the second position in the worksite may be performed while the robotic machine is stationary in the website. The target on the machine may be a retroreflective target. The method of determining the orientation of a robotic machine at a worksite may be used with a robotic machine which moves about a worksite and makes layout marks on the floor by lowering a marker into contact with the floor at desired locations.

The method may further comprise the steps of moving the target to one or more positions on the machine between the first and second positions. The one or more positions are known with respect to the machine, and with respect to the first and second positions. The locations of the one or more positions in the worksite are determined. The orientation of the vector is determined with respect to the worksite based on the locations of the first, second and one or more positions on the machine. The one or more positions may lie on the vector between the first and second positions. The positions may be determined with a robotic total station which directs a beam of laser light at the target.

BRIEF DESCRIPTION

DETAILED DESCRIPTION

This relates to a method of determining the orientation or heading of a robotic machine of the type that can move about a worksite, such as the interior of a building. The orientation of the robotic machine is the direction that the machine faces, and that the machine will move when driven forward with its wheels aligned with the longitudinal axis of the machine. Such a machine is capable of a number of tasks but finds particular utility in automating the layout of the worksite by moving to accurately determined locations, and marking the floor to indicate various construction points and lines. The marks, typically made by a layout marker directly on the building floor, are defined by BIM data or other layout data.

Figure 1:
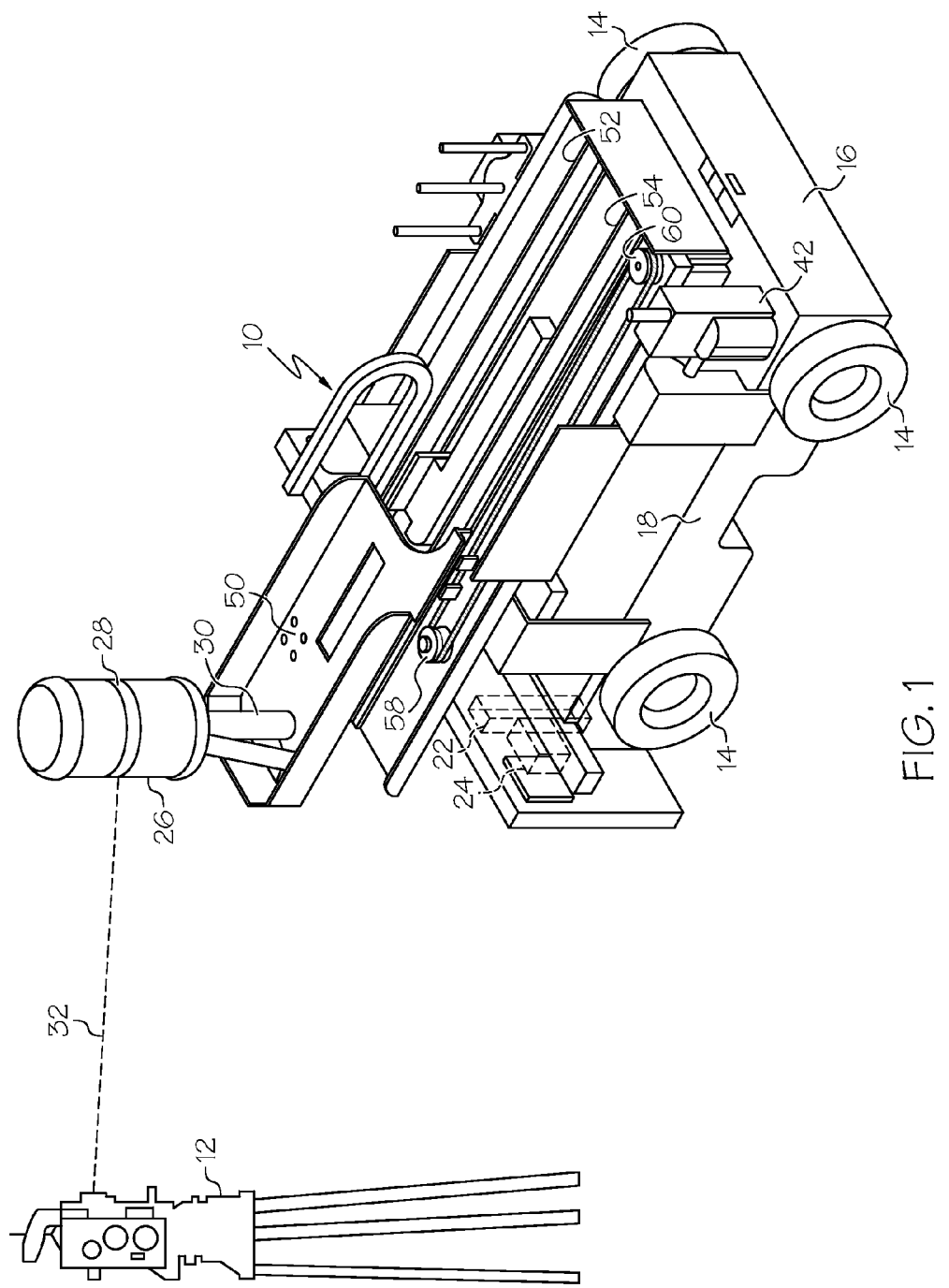
FIG. 1 is a diagrammatic view, depicting a robotic layout machine and a robotic total station at a construction site.
Figure 5:
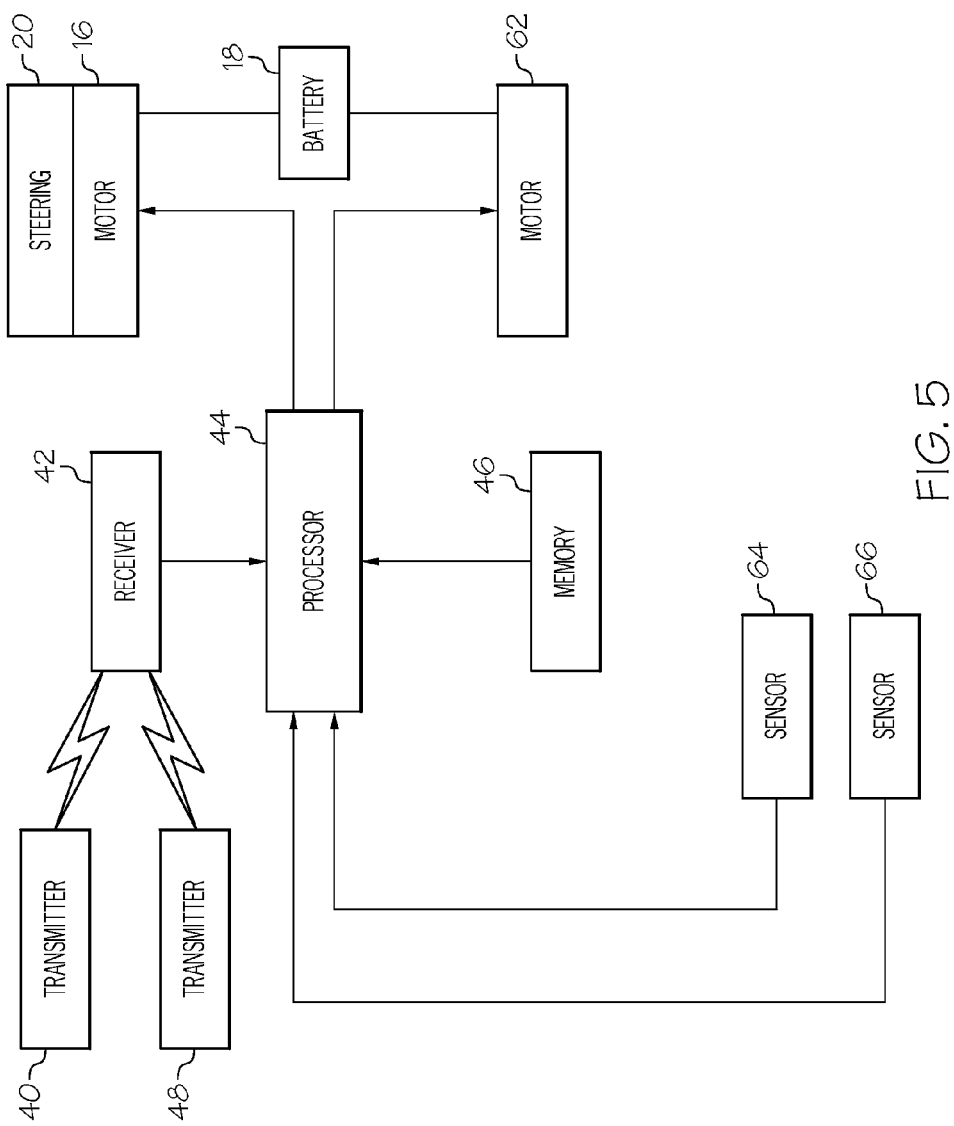
FIG. 5 is a schematic representation of the control system for the robotic layout machine.

FIG. 1 illustrates such a robotic layout machine 10 with a robotic total station 12 at the worksite. FIG. 5 illustrates the control arrangement for the machine 10. The robotic layout machine 10 includes four wheels 14, two or more of which are driven by an electric motor 16 powered by a battery 18. Additionally, two of the wheels 14 of the robotic layout machine 10 are connected to a powered steering mechanism 20. Steering mechanism 20 guides the machine 10 to desired locations at the worksite for drawing lines and marking other construction point marks on the worksite floor with a marker 22. Layout marker 22 is lowered into contact with the floor at desired locations by mechanism 24, which may be a solenoid, such that the robotic layout machine 10 marks a point on the floor of the worksite. A line may also be drawn across floor of the worksite by maintaining the marker 22 in contact with the floor as the robotic layout machine 10 is driven in the desired direction.

A target 26 is provided on the robotic layout machine 10. The target 26 may take the form of a generally cylindrical retroreflective target that is mounted on support 30. The target 26 it is accessible for reflection of a beam of laser light 32 directed from a robotic total station 12 located in any direction from the robotic layout machine 10. The target 26 may have a retroreflective covering or, alternatively, may include a retroreflective prism that receives and reflects light through a circumferential window 28 that extends around the target. The robotic total station 12 is positioned at a known location at the worksite. The robotic total station directs a beam 32 at the target and measures the time required for the light to travel from the total station 12 to the target 26 and return to the total station, thus providing an indication of the distance to the target. The direction of the beam 32 and the distance from the known position of the total station 12 to the target 26 provide an indication of the position of the target 26 at the worksite. In this mode of operation, the target 26 is located directly over the marker 22. When the target is positioned over a construction point and a mark is to be made on the worksite floor, the marker 22 is lowered into contact with the floor.

The total station 12 tracks the target 26 as the robotic machine 10 moves about the worksite. As indicated in FIG. 5, the robotic total station radio transmitter 40 continuously transmits location information to the robotic machine 10 where it is received by receiver 42 and supplied to processor 44. The processor 44 compares layout information stored in memory 46 with location information received from receiver 42 and determines which of the lines and marks defined by the layout data is next to be applied to the worksite floor. The steering system 20 and drive motor 16 are then actuated to drive the machine 10 to the next location. A transmitter 48 may be used by an operator to provide control instructions to the machine 10, including instructions as to which of the lines and marks defined by the layout data are to be made by the robotic machine.

It will be appreciated that it may be necessary to determine the orientation or heading of the robotic machine 10 from time to time. One way to make this assessment is to determine the location of the target 26 at two successive points in time as the machine 10 moves across the worksite floor. Assuming that the robotic machine was driven in a straight line during this time, the heading of the machine is defined by a vector extending between the two locations. This approach is not always possible, however, since the robotic machine is not continuously in motion.

Various situations require that the orientation of the machine 10 be determined. When the robotic machine 10 is first turned on, the location of the machine is determined by the total station 12, but the orientation of the robotic machine 10 is unknown. It will be appreciated that the orientation of the robotic machine 10 is needed to determine the path to the starting point of the marking operation in which the pattern of lines and marks is made on the worksite floor. Additionally, the orientation of the robotic machine 10 may be needed when the robotic machine has deviated from the programmed forward direction, such as when it has moved off track due to an environmental interference, or after it has performed a turn under circumstances that leave the heading of the machine uncertain. Other situations may occur which make the precise heading of the robotic machine uncertain.

The target 26 is supported on an upper, movable deck 50 which slides along rails 52 and 54. In order to determine the heading of the machine, the target is moved to first and second positions on the machine, and the locations of the first and second positions in the worksite are determined. The deck 50 is secured to a belt 56 that extends between pulleys 58 and 60. Pulley 60 is driven by motor 62 under control of processor 44. The movement of the deck 50 and the target 26 into the first and second positions is detected by sensors 64 and 66, respectively, as illustrated in FIGS. 2 and 3.

Figure 2:
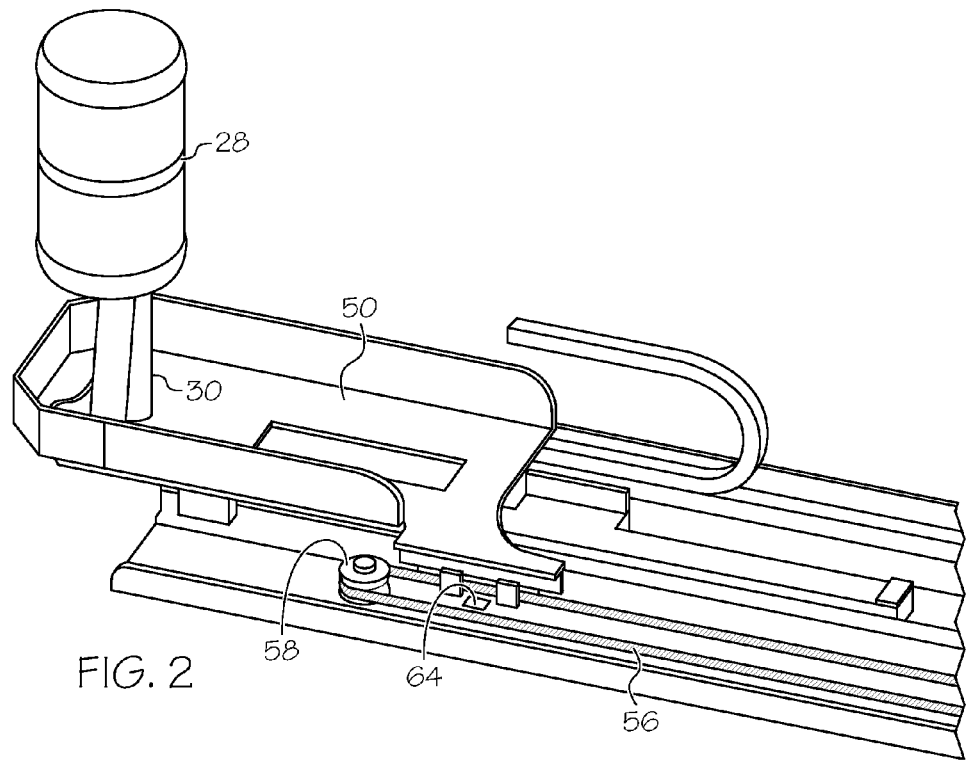
FIG. 2 shows a portion of the robotic layout machine with the target in a first position.
Figure 3:
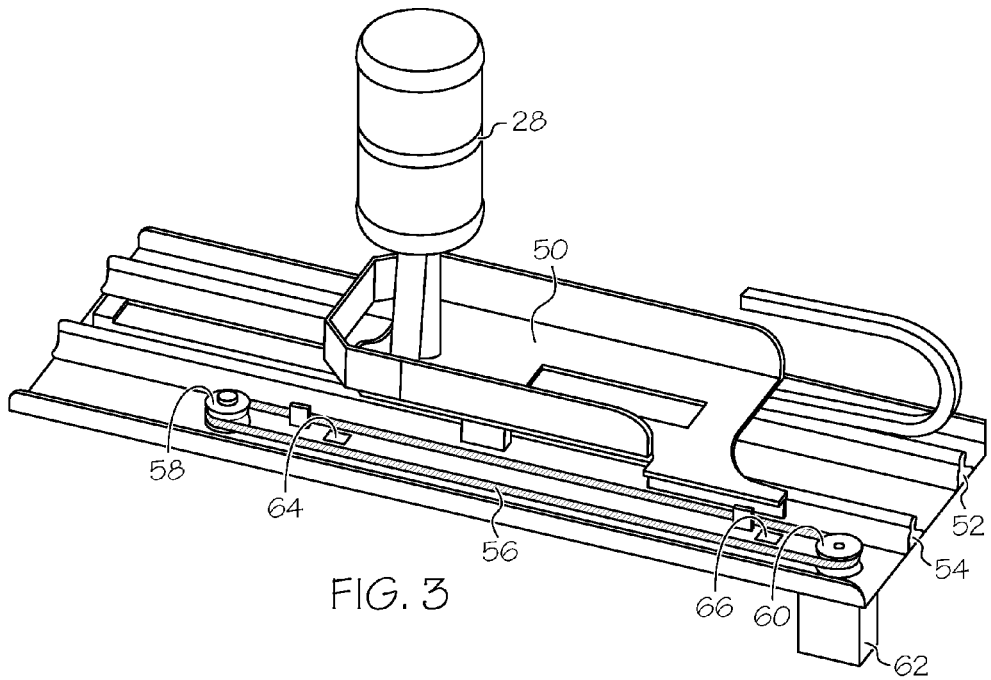
FIG. 3 shows a portion of the robotic layout machine with the target in a second position.

To determine the orientation or heading of the robotic machine 10, the target 26 is moved to a first position on the machine 10, as shown in FIG. 2. The machine 10 is stationary. The location of the first position in the worksite is then determined by directing a beam of laser light 32 at the target 26 from the robotic total station 12. Having made this assessment, the robotic total station 12 transmits the location information to the receiver 42. Next, the system moves the target to a second position on the machine, as shown in FIG. 3. The system determines the location of the second position in the worksite by directing the beam of laser light 32 at the target 26 from the robotic total station 12. This information is then transmitted from the robotic total station transmitter 40 to the machine receiver 42. It will be appreciated that system now has the locations of the first and second positions in the worksite and that those positions are being known with respect to the robotic layout machine 10. The first and second positions are spaced along the longitudinal axis of the machine, and therefore define a vector of known orientation with respect to the machine heading. The orientation of the vector with respect to the worksite is therefore an indication of the orientation of the machine 10.

As indicated previously, the location of the robotic total station 12 in the worksite must be known, since the position of the robotic machine 10 is determined relative to the position of the total station 12. The location of the robotic station 12 in the worksite may be determined by measuring the relative position of the robotic total station 12 from known reference positions at the worksite. These may for example be openings, corners, or other design features of the building. The relative position of the robotic total station 12 from these known reference positions is determined by directing the beam of laser light 32 from the robotic total station 12 to each of the known reference positions and then determining the distance to and direction to each of the known reference positions. To facilitate this and permit reference positions somewhat more distant from the robotic total station 12 to be used, a retroreflective target may be positioned at each of the known reference positions.

Figure 4:
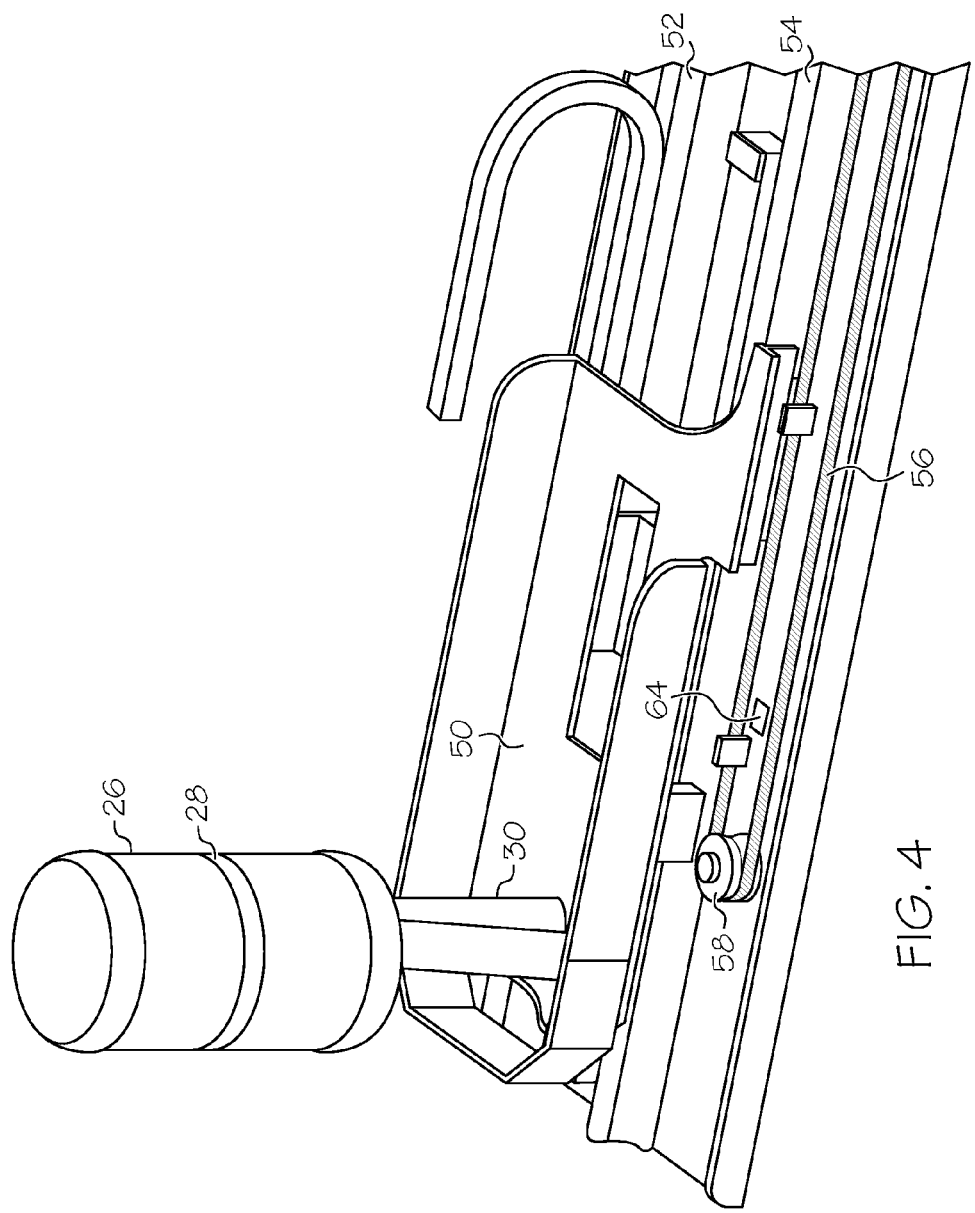
FIG. 4 shows a portion of the robotic layout machine with the target in a third position, intermediate the first and second positions.

If desired, the target 26 may be moved to more than two positions on the machine 12 as a part of the orientation determination process. The target 26 may be moved to one or more positions on the machine that lie between the first and second positions. FIG. 4 shows the target 26 at a third known position with respect to the longitudinal axis of the machine, between the first and second positions. The robotic total station may determine the location of the one or more positions in the worksite. The orientation vector may be determined with respect to the worksite based on the locations of the first, second, and one or more positions on the machine 10.

Other aspects, objects, and advantages of the embodiments can be obtained from a study of the drawings, the disclosure, and the appended claims.

What is claimed is:

1. A method of determining the orientation of a robotic machine at a worksite, comprising:
   providing a target on said machine,
   moving said target to a first position on said machine,
   determining the location of said first position in said worksite,
   moving said target to a second position on said machine,
   determining the location of said second position in said worksite, said first and second positions being known with respect to said machine, and defining a vector therebetween of a known orientation with respect to said machine, and
   determining the orientation of said vector with respect to said worksite,
   wherein said moving of said target to said first position and said moving of said target to said second position are performed by a processor associated with said machine.

2. The method of claim 1, in which the steps of determining the location of said first position in said worksite and determining the location of said second position in said worksite are performed by a robotic total station that directs a beam of laser light at said target when said target is in said first position and said second position.

3. The method of claim 1, in which the steps of determining the location of said first position in said worksite, moving said target to a second position on said machine, said first and second positions being known with respect to said machine, and defining a vector therebetween of a known orientation with respect to said machine, and determining the location of said second position in said worksite are performed while the robotic machine is stationary in the worksite.

4. The method of claim 1, in which the step of providing a target on said machine includes the step of providing a retroreflective target on said machine.

5. The method of claim 1, further comprising:
   moving said target to one or more positions on said machine between said first and second positions, said one or more positions being known with respect to said machine, and with respect to said vector between said first and second positions,
   determining the locations of said one or more positions in said worksite, and
   determining the orientation of said vector with respect to said worksite based on the locations of said first, second and one or more positions on said machine.

6. The method of claim 5, in which said one or more positions lie on said vector between said first and second positions.

7. A method of determining the location and orientation of a robotic machine which moves about a worksite, comprising:
   providing a target on said machine,
   determining the location of the robotic machine in the worksite by directing a beam of laser light at the target from a robotic total station, said robotic total station being located at a known position in the worksite,
   moving said target to a first position on said machine,
   determining the location of said first position in said worksite by directing a beam of laser light at the target from the robotic total station,
   moving said target to a second position on said machine,
   determining the location of said second position in said worksite by directing a beam of laser light at the target from the robotic total station, said first and second positions being known with respect to said machine, and defining a vector therebetween of a known orientation with respect to said machine, and
   determining the orientation of said vector with respect to said worksite,
   determining the location of the machine and the orientation of the machine in the worksite based on the orientation of said vector,
   wherein said moving of said target to said first position and said moving of said target to said second position are performed by a processor associated with said machine.

8. The method of determining the location and orientation of a robotic machine which moves about a worksite according to claim 7, in which the step of providing a target on said machine includes the step of providing a retroreflective target on said machine.

9. The method of determining the location and orientation of a robotic machine which moves about a worksite according to claim 7, in which the steps of determining the location of said first position in said worksite by directing a beam of laser light at the target from the robotic total station, moving said target to a second position on said machine, and determining the location of said second position in said worksite by directing a beam of laser light at the target from the robotic total station, said first and second positions being known with respect to said machine, and defining a vector therebetween of a known orientation with respect to said machine, are performed which the robotic machine is stationary in the worksite.

10. The method of determining the location and orientation of a robotic machine which moves about a worksite according to claim 7, further comprising the steps of:
    moving said target to one or more positions on said machine between said first and second positions, said one or more positions being known with respect to said machine, and with respect to said vector between said first and second positions,
    determining the locations of said one or more positions in said worksite, and
    determining the orientation of said vector with respect to said worksite based on the locations of said first, second and one or more positions on said machine.

11. The method of claim 10, in which said one or more positions lie on said vector between said first and second positions.

12. A method of controlling a robotic machine which moves about a worksite and makes layout marks on the floor by lowering a marker into contact with the floor at desired locations, said robotic machine being capable of drawing a line across floor of the worksite by maintaining the marker in contact with the floor as the robotic machine moves, comprising
    providing a robotic machine capable of movement about a worksite and making layout marks on the floor of the worksite by bringing a marker on the machine into contact with the floor of the worksite to produce layout marks, providing a target on said machine, determining the location of the robotic machine in the worksite by directing a beam of laser light at the target from a robotic total station, said robotic total station being located at a known position in the worksite, moving said target to a first position on said machine, determining the location of said first position in said worksite by directing a beam of laser light at the target from the robotic total station, moving said target to a second position on said machine, determining the location of said second position in said worksite by directing a beam of laser light at the target from the robotic total station, said first and second positions being known with respect to said machine, and defining a vector therebetween of a known orientation with respect to said machine, determining the orientation of said vector with respect to said worksite, and determining the location of the machine and the orientation of the machine in the worksite based on the orientation of said vector, wherein said moving of said target to said first position and said moving of said target to said second position are performed by a processor associated with said machine.

13. The method of claim 12, further comprising the step of moving said robotic machine to a point in said worksite where a layout mark in the form of a line is to be made on the floor, moving said marker into contact with the floor, and moving said robotic machine such that the line is marked on the floor.

14. The method of claim 12, in which the steps of determining the location of said first position in said worksite by directing a beam of laser light at the target from the robotic total station, moving said target to a second position on said machine, and determining the location of said second position in said worksite by directing a beam of laser light at the target from the robotic total station, said first and second positions being known with respect to said machine, and defining a vector therebetween of a known orientation with respect to said machine are performed while the robotic machine is stationary in the worksite.

15. The method of claim 12, in which the step of providing a target on said machine includes the step of providing a retroreflective target on said machine.

16. The method of claim 12, in which the position of the robotic total station in the worksite is determined by measuring the relative position of the robotic total station from known reference positions in said worksite.

17. The method of claim 16, in which the relative position of the robotic total station from known reference positions is determined by directing a beam of laser light from the robotic total station to each of the known reference positions and determining the distance to and direction to each of the known reference positions.

18. The method of claim 17, in which a retroreflective target is positioned at each of said known reference positions.

* * * * *